(12) United States Patent
Kell et al.

(10) Patent No.: US 10,408,081 B2
(45) Date of Patent: Sep. 10, 2019

(54) INSPECTION APPARATUS AND METHODS OF INSPECTING GAS TURBINE ENGINES

(71) Applicant: ROLLS-ROYCE plc, London (GB)

(72) Inventors: James Kell, Nottingham (GB); Graeme E Rigg, Derby (GB)

(73) Assignee: ROLLS-ROYCE plc, London (GB)

( * ) Notice: Subject to any disclaimer, the term of this patent is extended or adjusted under 35 U.S.C. 154(b) by 446 days.

(21) Appl. No.: 15/287,935

(22) Filed: Oct. 7, 2016

(65) Prior Publication Data

US 2017/0122123 A1 May 4, 2017

(30) Foreign Application Priority Data

Nov. 3, 2015 (GB) .................................. 1519426.9

(51) Int. Cl.
*F01D 17/02* (2006.01)
*G01M 15/14* (2006.01)

(52) U.S. Cl.
CPC ............. *F01D 17/02* (2013.01); *G01M 15/14* (2013.01)

(58) Field of Classification Search
CPC ...... F01D 17/02; F01D 21/003; F01D 25/285; G01M 15/14; F05D 2260/12; F05D 2260/83; F05D 2230/72
See application file for complete search history.

(56) References Cited

U.S. PATENT DOCUMENTS

| | | | |
|---|---|---|---|
| 6,793,399 B1 | 9/2004 | Nguyen | |
| 8,713,999 B2 * | 5/2014 | Hatcher | F01D 21/003 73/112.01 |
| 2004/0216468 A1 | 11/2004 | Hatcher | |
| 2013/0088588 A1 | 4/2013 | Scott et al. | |
| 2013/0192353 A1 * | 8/2013 | Hatcher | F01D 21/003 73/112.01 |
| 2014/0070058 A1 * | 3/2014 | Miller | F01D 25/28 248/65 |
| 2014/0130583 A1 * | 5/2014 | Kell | G01M 15/14 73/112.05 |
| 2015/0002841 A1 * | 1/2015 | Konomura | F01D 5/12 356/241.6 |

(Continued)

FOREIGN PATENT DOCUMENTS

| | | |
|---|---|---|
| EP | 2 119 875 A2 | 11/2009 |
| GB | 2 226 381 A | 6/1990 |
| GB | 2 507 980 A | 5/2014 |

(Continued)

OTHER PUBLICATIONS

May 5, 2016 Search Report issued in British Patent Application No. 1519426.9.

(Continued)

*Primary Examiner* — Eldon T Brockman (74) *Attorney, Agent, or Firm* — Oliff PLC (57) ABSTRACT

Inspection apparatus for a gas turbine engine, the inspection apparatus comprising: a sensor configured to generate data; a housing having an exterior surface and configured to house the sensor therein; and one or more foam members coupled to the exterior surface of the housing, the one or more foam members being resilient to enable the inspection apparatus to be inserted into a gas turbine engine and secured between at least two surfaces of the gas turbine engine.

10 Claims, 9 Drawing Sheets

(56) References Cited

U.S. PATENT DOCUMENTS

2017/0122123 A1\* 5/2017 Kell ..................... G01M 15/14

FOREIGN PATENT DOCUMENTS

| GB | 2 512 119 A | 9/2014 |
|----|-------------|--------|
| JP | 2004-201991 A | 7/2004 |
| JP | 2005-245786 A | 9/2005 |
| WO | 2013/116078 A1 | 8/2013 |
| WO | 2014/107247 A1 | 7/2014 |

OTHER PUBLICATIONS

Oct. 12, 2018 Office Action issued in European Patent Application No. 16 192 380.0.
Feb. 2, 2017 Search Report issued in European Patent Application No. 16 19 2380.
Feb. 1, 2019 Office Action issued in British Patent Application No. 1519426.9.

\* cited by examiner

INSPECTION APPARATUS AND METHODS OF INSPECTING GAS TURBINE ENGINES

TECHNICAL FIELD

The present disclosure concerns inspection apparatus and methods of inspecting gas turbine engines.

BACKGROUND

In operation, gas turbine engines are subject to relatively high temperatures and forces that may cause wear to the engine. Furthermore, debris entering the gas turbine engine may cause damage to the engine (usually referred to as foreign object damage). For example, debris may cause damage to the compressor blades and vanes of the engine as the debris moves along the gas path of the engine. In order to maintain safety, performance and efficiency of the engine, regular inspections are typically carried out by an inspector using a borescope which may be inserted into the engine via one of the several borescope holes in the casing of the engine.

BRIEF SUMMARY

According to various, but not necessarily all, embodiments there is provided inspection apparatus for a gas turbine engine, the inspection apparatus comprising: a sensor configured to generate data; a housing having an exterior surface and configured to house the sensor therein; and one or more foam members coupled to the exterior surface of the housing, the one or more foam members being resilient to enable the inspection apparatus to be inserted into a gas turbine engine and secured between at least two surfaces of the gas turbine engine.

The housing may have a longitudinal axis and a length along the longitudinal axis. The one or more foam members may have a length along the longitudinal axis of between twenty five percent and one hundred percent of the length of the housing. The one or more foam members may have a length along the longitudinal axis of between twenty five percent and thirty five percent of the length of the housing.

The at least two surfaces of the gas turbine engine may comprise a suction surface of a first aerofoil and a pressure surface of a second aerofoil.

The inspection apparatus may be shaped and dimensioned to be inserted into a borescope hole of a gas turbine engine.

The housing may have a longitudinal axis and a maximum dimension perpendicular to the longitudinal axis. The one or more foam members may have a maximum dimension perpendicular to the longitudinal axis greater than the maximum dimension of the housing.

The sensor may comprise a camera configured to generate images.

The inspection apparatus may further comprise a light emitter configured to emit light within a field of view of the camera. The light emitter may be housed by the housing.

The inspection apparatus may further comprise communication circuitry configured to wirelessly transmit the generated data. The communication circuitry may be housed by the housing.

The inspection apparatus may further comprise a memory configured to store the generated data. The memory may be housed by the housing.

The inspection apparatus may further comprise an electrical energy storage device configured to supply electrical energy to at least the sensor. The electrical energy storage device may be housed by the housing.

The inspection apparatus may further comprise a connector configured to connect to a positioning tool.

According to various, but not necessarily all, embodiments there is provided a method of inspecting a gas turbine engine, the method comprising: providing one or more inspection apparatus as claimed in any of the preceding claims; inserting one or more inspection apparatus into a gas turbine engine so that the inspection apparatus is secured between at least two surfaces of the gas turbine engine; and causing relative movement between a part of the gas turbine engine and the inspection apparatus, the part of the gas turbine engine being adjacent to the at least two surfaces.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION

Embodiments will now be described by way of example only, with reference to the Figures, in which.

DETAILED DESCRIPTION

In the following description, the terms 'connected' and 'coupled' mean operationally connected and coupled. It should be appreciated that there may be any number of intervening components between the mentioned features, including no intervening components.

Figure 1:
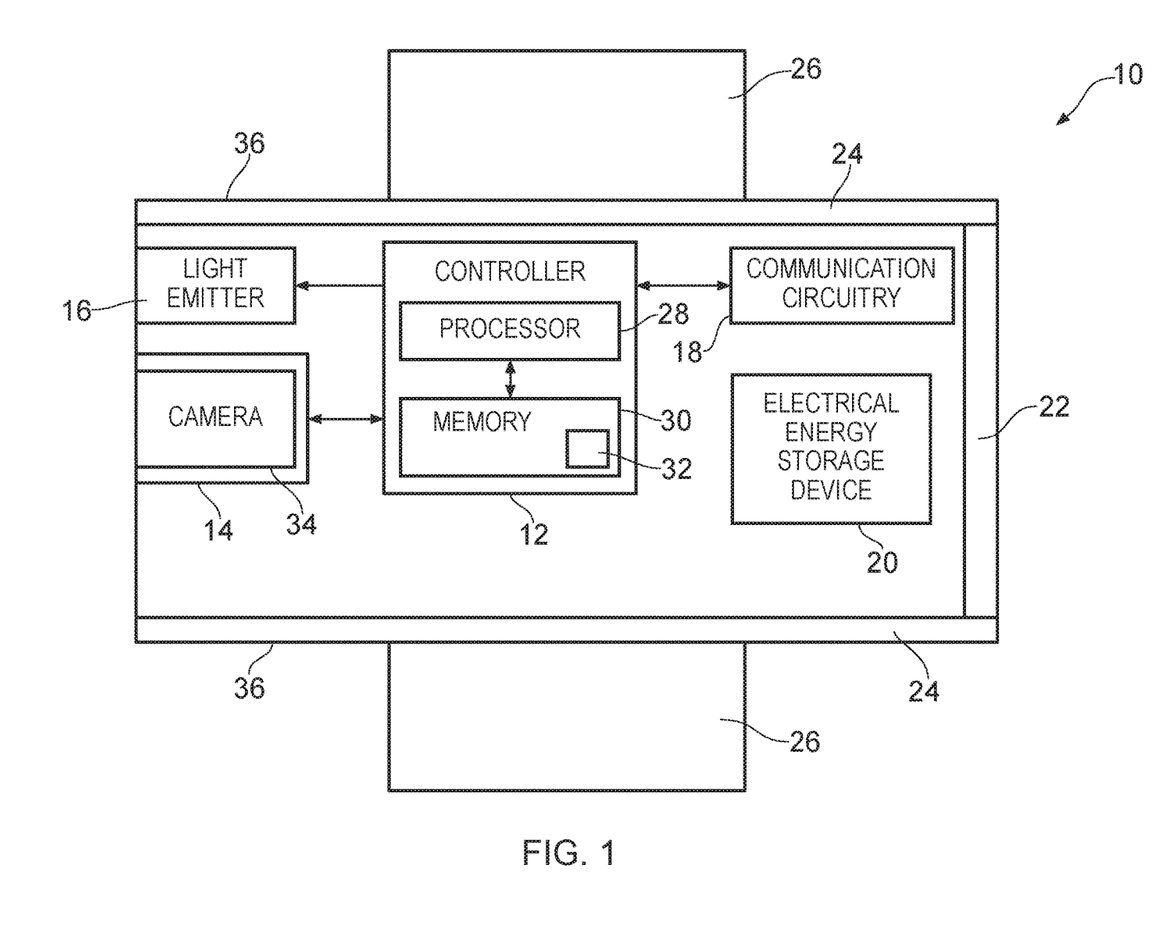
FIG. 1 illustrates a schematic diagram of inspection apparatus according to various examples.

FIG. 1 illustrates a schematic diagram of an inspection apparatus 10 according to various examples. The inspection apparatus 10 includes a controller 12, a sensor 14, a light emitter 16, communication circuitry 18, an electrical energy storage device 20, a connector 22, a housing 24, and one or more foam members 26. In summary, the inspection apparatus 10 may be inserted into a gas turbine engine via a borescope hole and secured between at least two surfaces of the gas turbine engine (for example, between two aerofoils). In particular, the one or more foam members 26 may be compressed between the two surfaces and consequently exert an outward force against the two or more surfaces that fixes the inspection apparatus 10 in position. The sensor 14 may capture data concerning the gas turbine engine for analysis by an inspector and/or by a computer. The inspection apparatus 10 may be referred to as a 'capsule camera'.

In some examples, the inspection apparatus 10 may be a module. As used herein, the wording 'module' refers to a device or apparatus where one or more features are included at a later time, and possibly, by another manufacturer or by an end user. For example, where the inspection apparatus 10 is a module, the inspection apparatus 10 may only include the sensor 14, the housing 24 and the one or more foam members 26, and the remaining features may be added by another manufacturer.

The controller 12 may comprise any suitable circuitry to cause performance of the methods described herein. The controller 12 may comprise: at least one application specific integrated circuit (ASIC); and/or at least one field programmable gate array (FPGA); and/or single or multi-processor architectures; and/or sequential (Von Neumann)/parallel architectures; and/or at least one programmable logic controllers (PLCs); and/or at least one microprocessor; and/or at least one microcontroller; and/or a central processing unit (CPU); and/or a graphics processing unit (GPU), to perform the methods.

The controller 12 may comprise at least one processor 28 and at least one memory 30. The memory 30 stores a computer program 32 comprising computer readable instructions that, when read by the processor 28, cause performance of the methods described herein. The computer program 32 may be software or firmware, or may be a combination of software and firmware.

The processor 28 may comprise any suitable architecture and may comprise a single processing core or multiple processing cores. The memory 30 may be any suitable non-transitory computer readable storage medium, data storage device or devices, and may comprise solid state memory (such as flash memory). The memory 30 may be permanent non-removable memory, or may be removable memory (such as a secure digital (SD) card).

The sensor 14 may comprise one or more sensors configured to sense one or more properties of a gas turbine engine and generate data. The sensor 14 may include a camera 34 (such as a complementary metal oxide semiconductor (CMOS) camera or a charge coupled device (CCD) camera) for generating images of the gas turbine engine. The sensor 14 may alternatively or additionally include one or more of a temperature sensor, an acidity (PH) sensor, a chemical sensor. The controller 12 is configured to receive the generated data from the sensor 14.

The light emitter 16 may comprise any suitable circuitry for generating light. For example, the light emitter 16 may comprise one or more light emitting diodes (LEDs) and/or one or more organic light emitting diodes (OLEDS). The light emitter 16 is configured to emit light within a field of view of the camera 34. The controller 12 is configured to control the operation of the light emitter 16. In some examples, the inspection apparatus 10 may not comprise a light emitter 16 (for example, where the inspection apparatus 10 does not comprise a camera, or where illumination is provided by a light emitter external to the inspection apparatus 10).

In some examples, the light emitter 16 may be configured to emit electromagnetic radiation outside of the wavelengths visible to humans (that is, outside of the wavelengths of 400 nm to 700 nm) and the term 'light' should be understood to include wavelengths outside of the electromagnetic spectrum visible to humans. For example, the light emitter 16 may be configured to emit infrared radiation (wavelengths of 700 nm to 1 mm) or ultraviolet radiation (that is, wavelengths of 400 nm to 10 nm). In these examples, the sensor 14 may comprise one or more sensors for sensing infrared and/or ultraviolet radiation.

The communication circuitry 18 is configured to transmit the data generated by the sensor 14. In some examples, the communication circuitry 18 may comprise a radio frequency transmitter and an antenna that are configured to wirelessly transmit the generated data. In other examples, the communication circuitry 18 may additionally or alternatively comprise an interface (such as a micro Universal Serial Bus (USB) interface) that is configured to transmit the generated data via a wired link. The controller 12 may be configured to control the communication circuitry 18 to transmit the data generated by the sensor 14.

The electrical energy storage device 20 is configured to supply electrical energy to the electronic components of the inspection apparatus 10. The electrical energy storage device 20 may comprise one or more batteries (such as one or more lithium ion batteries) and/or may comprise a supercapacitor. The controller 12 may be configured to control the supply of electrical energy from the electrical energy storage device 20 to the electronic components of the inspection apparatus 10.

Figure 4:
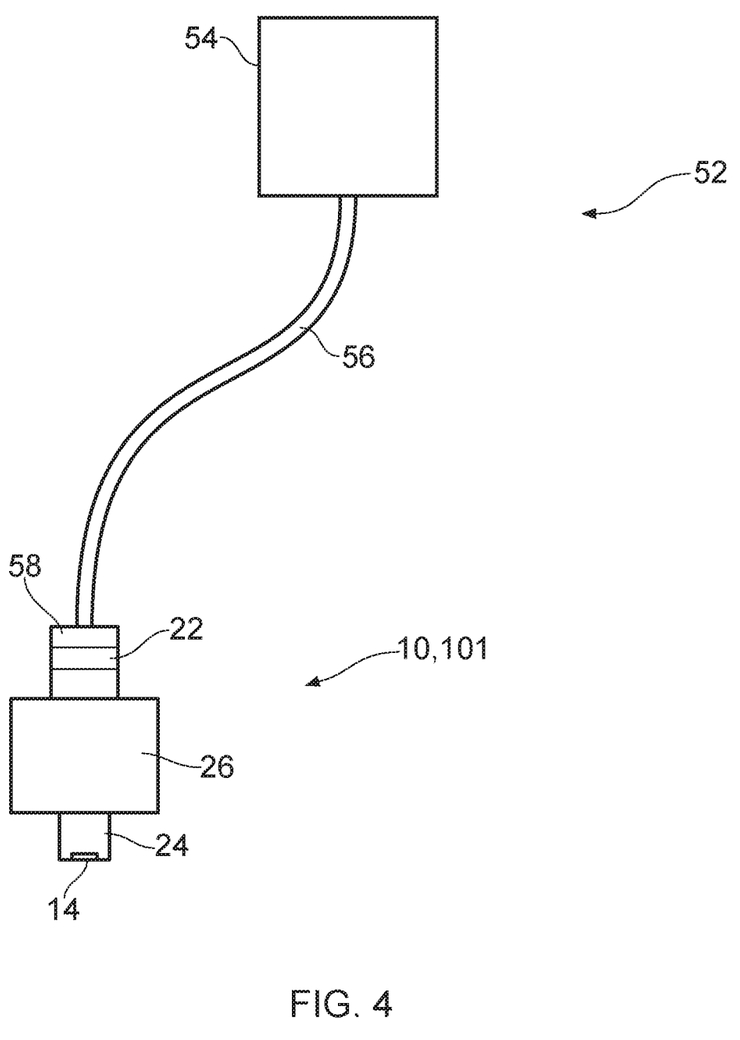
FIG. 4 illustrates a schematic diagram of a positioning tool and an inspection apparatus according to various examples.

The connector 22 is configured to connect to a positioning tool (described in greater detail in the proceeding paragraphs with reference to FIG. 4) and may comprise any suitable mechanism. For example, the connector 22 may comprise a magnet for coupling to an electromagnet of the positioning tool. By way of a further example, the connector 22 may comprise a socket that is configured to receive an adjustable plug of the positioning tool.

The housing 24 is configured to house at least the sensor 14 therein. In various examples, the housing 24 additionally houses the controller 12, the light emitter 16, the communication circuitry 18, the electrical energy storage device 20 and the connector 22 therein. The housing 24 has an exterior surface 36 that may define at least a part of an exterior surface of the inspection apparatus 10 (in other words, at least a part of the exterior surface 36 may be touched by an operator). The housing 24 may have any suitable shape and dimensions for enabling the inspection apparatus 10 to be inserted into a borescope hole of a gas turbine engine. For example, the housing 24 may be cylindrical having a diameter of five to ten millimetres and a length of a few centimetres.

The one or more foam members 26 are coupled to the exterior surface 36 of the housing 24. For example, the one or more foam members 26 may be coupled via a double sided adhesive tape, via an adhesive such as glue, or via a hook and fleece arrangement. The one or more foam members 26 are resilient to enable the inspection apparatus 10 to be inserted into a gas turbine engine and secured between at least two surfaces of the gas turbine engine. The one or more foam members 26 may comprise any suitable foam or sponge and may, for example, have the following parameters: pore size of 90 ppi; density of 27 to 33 Kg/m$^3$; tensile strength of 125 kpa; elongate at break of 210% minimum; compression load deflection of 2.6 to 4.6%; and temperature range of −30 to 110 Celsius. The one or more foam members 26 may define any suitable shape or shapes. For example, the one or more foam members 26 may be cylindrical, conical, or cuboidal.

Figure 2:
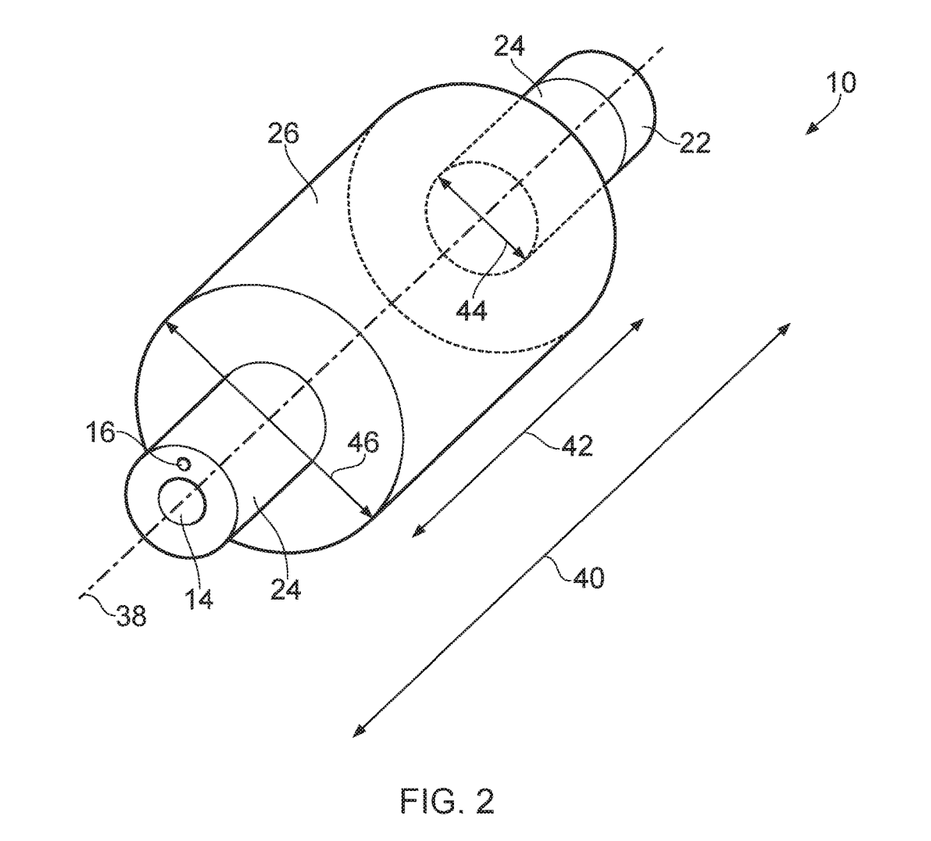
FIG. 2 illustrates a perspective view diagram of the inspection apparatus illustrated in FIG. 1.

As illustrated in FIG. 2, the housing 24 may have a longitudinal axis 38 and a length 40 along the longitudinal axis 40. The one or more foam members 26 may have a length 42 along the longitudinal axis 38 of between twenty five percent and one hundred percent of the length 40 of the housing 24. In some examples, the one or more foam members 26 may have a length 42 along the longitudinal axis 38 of between twenty five percent and thirty five percent of the length 40 of the housing 24. For example, where the length 40 of the housing 24 is 30 mm, the length 42 of the one or more foam members 26 may be 10 mm.

The housing 24 has a maximum dimension 44 perpendicular to the longitudinal axis 38. The one or more foam members 26 have a maximum dimension 46 perpendicular to the longitudinal axis 38 that is greater than the maximum dimension 44 of the housing 24. For example, where the housing 24 and the one or more foam members 26 are cylindrical or cone shaped, the maximum diameter 46 of the one or more foam members 26 is greater than the maximum diameter 44 of the housing 24.

In some examples, the maximum dimension 46 of the one or more foam members 26 may be 30% or greater than the width of the gap defined by the at least two surfaces of the gas turbine engine which the inspection apparatus 10 is to be secured between. For example, where the inspection apparatus 10 is to be secured between two compressor aerofoils defining a gap of 16 mm, the maximum diameter 46 of the one or more foam members may be equal to or greater than 22 mm.

Figure 3:
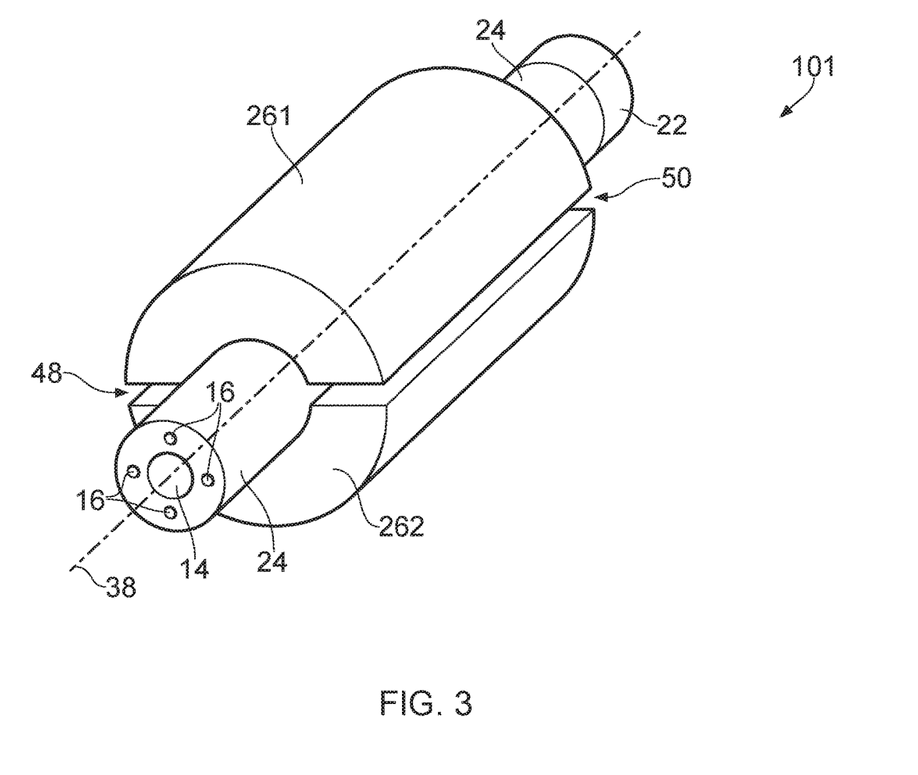
FIG. 3 illustrates a perspective view diagram of another inspection apparatus according to various examples.

FIG. 3 illustrates a perspective view diagram of another inspection apparatus 101 according to various examples. The inspection apparatus 101 is similar to the inspection apparatus 10 and where the features are similar, the same reference numerals are used. The inspection apparatus 101 differs from the inspection apparatus 10 in that the inspection apparatus 101 comprises a plurality of light emitters 16 spaced around the longitudinal axis 38. Furthermore, the inspection apparatus 101 includes a first foam member 261 and a second foam member 262. In cross section, the first and second foam members 261, 262 have a hemispherical shape and define a first gap 48 and a second gap 50 there between.

FIG. 4 illustrates a schematic diagram of a positioning tool 52 and an inspection apparatus 10, 101 according to various examples. The positioning tool 52 includes a control unit 54, a snake arm 56 and a connector 58. In summary, the positioning tool 52 is configured to insert the inspection apparatus 10, 101 between at least two surfaces of a gas turbine engine and then detach from the inspection apparatus 10, 101, leaving the inspection apparatus 10, 101 within the gas turbine engine to enable inspection of the gas turbine engine.

The control unit 54 is configured to control the operation of the snake arm 56 and the connector 58. In some examples, the control unit 54 may include a controller (for example, comprising a processor and a memory or other circuitry as described above for the controller 12) for controlling the operation of the snake arm 56 and the connector 58. Such a control unit 54 may automatically control the operation of the snake arm 56 and the connector 58, or may additionally comprise a user input device (such as a joystick, a computer mouse, or a keyboard) to enable an operator to control the operation of the snake arm 56 and the connector 58. In other examples, the control unit 54 may not comprise a controller and may instead comprise a mechanical user input device (such as one or more levers and switches) for enabling an operator to control the operation of the snake arm 56 and the connector 58.

The snake arm 56 (which may also be referred to as a continuum robot) has a first end coupled to the connector 58 and a second end coupled to the control unit 54. The connector 58 may comprise any suitable mechanism for attaching to, and detaching from, the connector 22 of the inspection apparatus 10, 101. For example, the connector 58 may comprise an electro-magnet that may be controlled by the control unit 54 to attach to, and detach from, the connector 22 of the inspection apparatus 10, 101. In other examples, the connector 58 may comprise an adjustable plug that is configured to radially expand and contract to engage and disengage a socket 22 of the inspection apparatus 10, 101.

Figure 5:
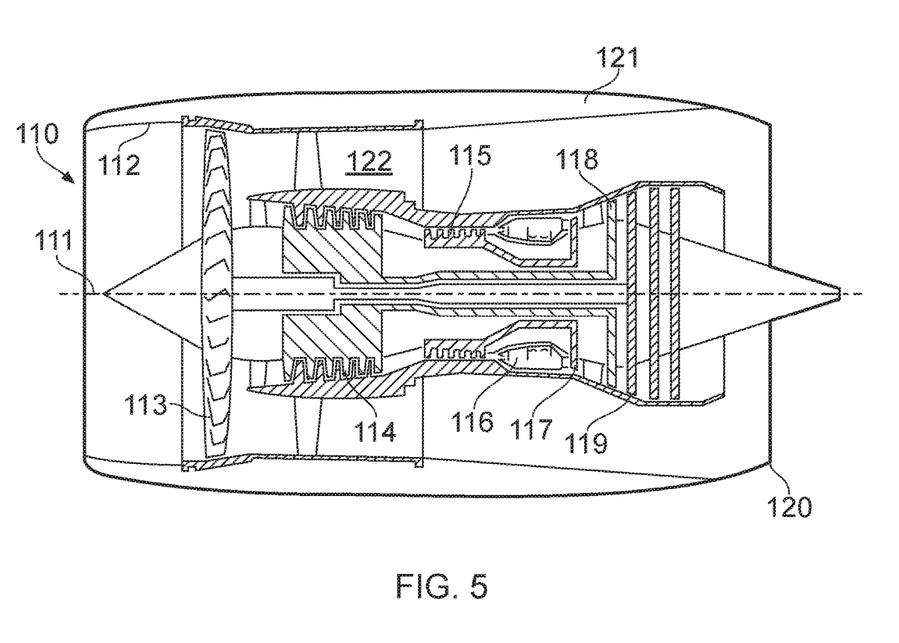
FIG. 5 illustrates a cross sectional diagram of a gas turbine engine according to various examples.

FIG. 5 illustrates a cross sectional diagram of a gas turbine engine 110 according to various examples. The gas turbine engine 110 has a principal and rotational axis 111 and comprises, in axial flow series, an air intake 112, a propulsive fan 113, an intermediate pressure compressor 114, a high-pressure compressor 115, combustion equipment 116, a high-pressure turbine 117, an intermediate pressure turbine 118, a low-pressure turbine 119 and an exhaust nozzle 120. A nacelle 121 generally surrounds the engine 110 and defines both the intake 112 and the exhaust nozzle 120.

The gas turbine engine 110 operates so that air entering the intake 112 is accelerated by the fan 113 to produce two air flows: a first air flow into the intermediate pressure compressor 114 and a second air flow which passes through a bypass duct 122 to provide propulsive thrust. The intermediate pressure compressor 114 compresses the air flow directed into it before delivering that air to the high pressure compressor 115 where further compression takes place.

The compressed air exhausted from the high-pressure compressor 115 is directed into the combustion equipment 116 where it is mixed with fuel and the mixture combusted. The resultant hot combustion products then expand through, and thereby drive the high, intermediate and low-pressure turbines 117, 118, 119 before being exhausted through the nozzle 120 to provide additional propulsive thrust. The high 117, intermediate 118 and low 119 pressure turbines drive respectively the high pressure compressor 115, intermediate pressure compressor 114 and fan 113, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 6:
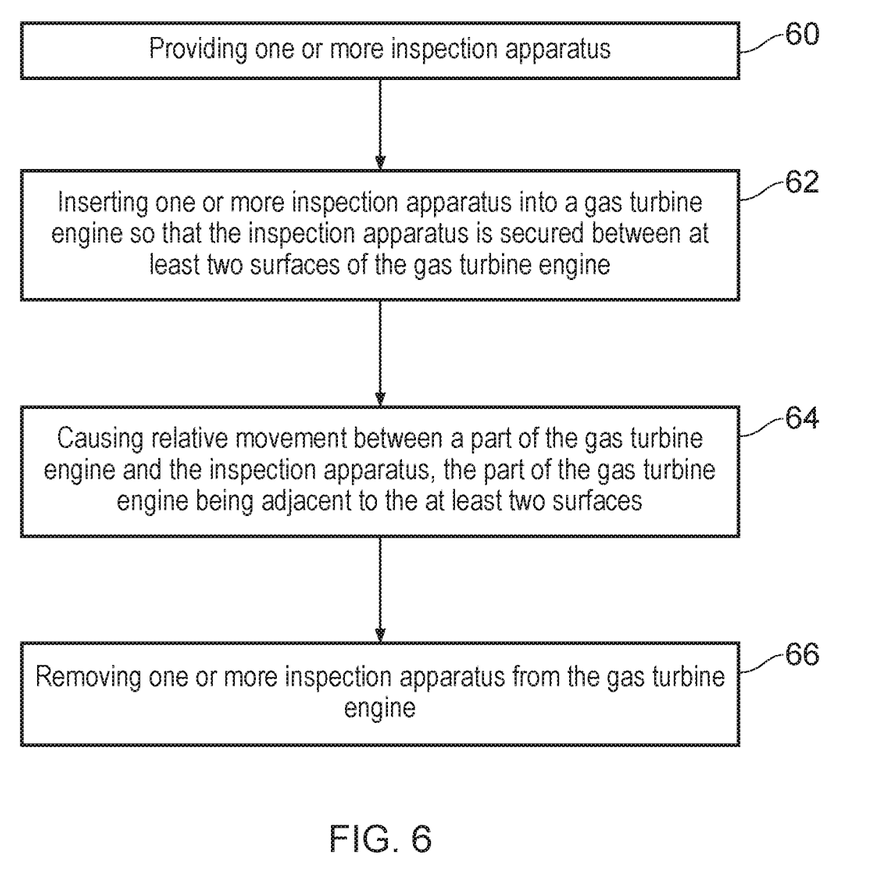
FIG. 6 illustrates a flow diagram of a method of inspecting a gas turbine engine according to various examples.

FIG. 6 illustrates a flow diagram of a method of inspecting a gas turbine engine 110 according to various examples.

At block 60, the method includes providing one or more inspection apparatus 10, 101. The method may also include providing a positioning tool 52 at block 60.

At block 62, the method includes inserting one or more inspection apparatus 10, 101 into a gas turbine engine (such as the gas turbine engine 110 illustrated in FIG. 5) so that the inspection apparatus 10, 101 is secured between at least two surfaces of the gas turbine engine.

Figure 7:
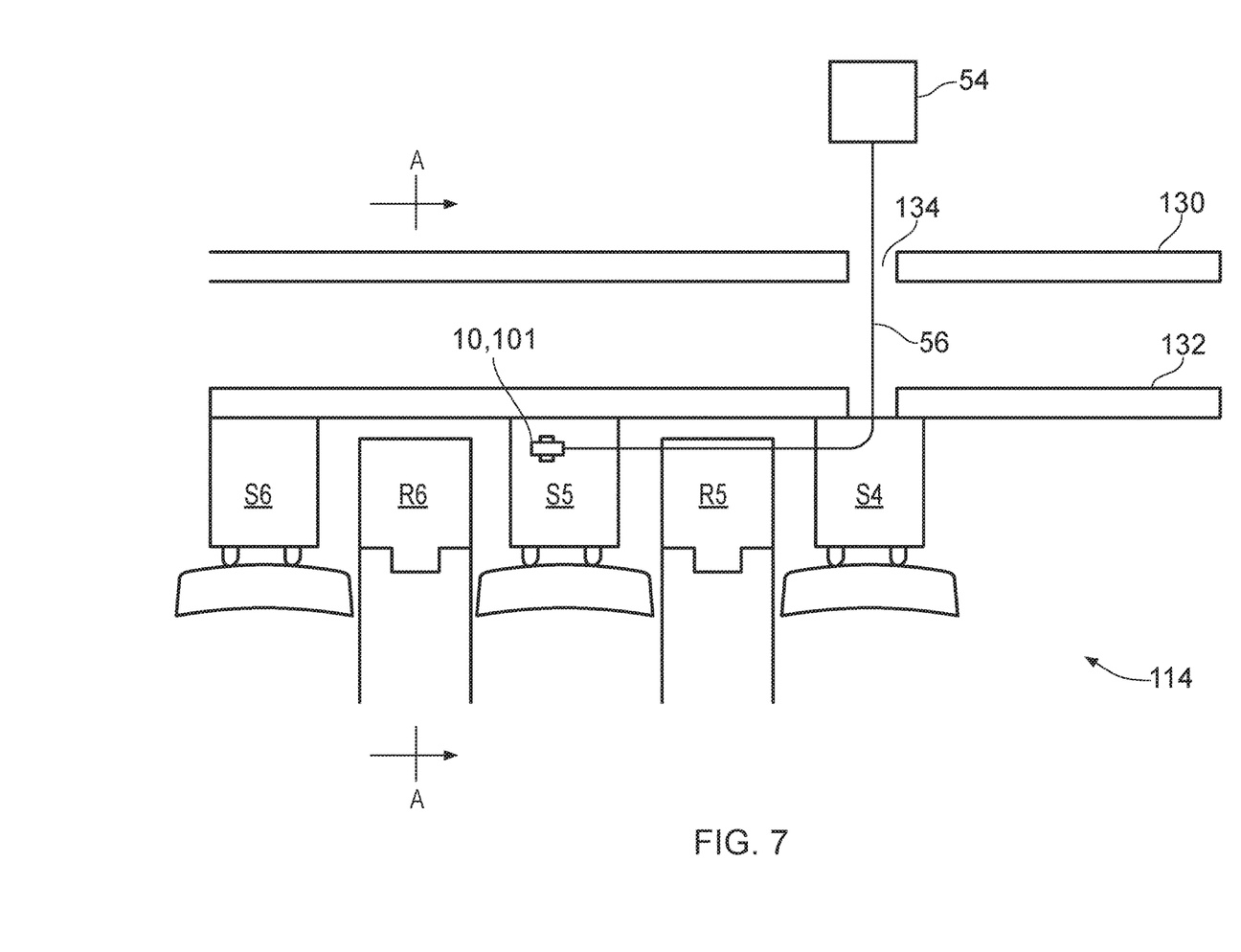
FIG. 7 illustrates a cross sectional diagram of a part of a gas turbine engine, a positioning tool and an inspection apparatus according to various examples.

By way of an example, FIG. 7 illustrates a cross sectional diagram of the high pressure compressor 114 of the gas turbine engine 110, the positioning tool 52 and the inspection apparatus 10, 101 according to various examples. The high pressure compressor 114 is contained within a housing comprising outer 130 and inner 132 cases. Both the outer and inner cases 130, 132 include an inspection port 134 (which may also be referred to as a borescope hole) through which the inspection apparatus 10, 101 and the positioning tool 52 may be inserted into the interior of the inner case 132 and manoeuvred to an observation location between at least two surfaces. The inspection port 134 comprises an aperture having a sufficient diameter for the inspection apparatus 10, 101 and the positioning tool 52 to be inserted there through, and can be sealed off when not in use to allow the high pressure compressor 114 to operate.

Figure 8:
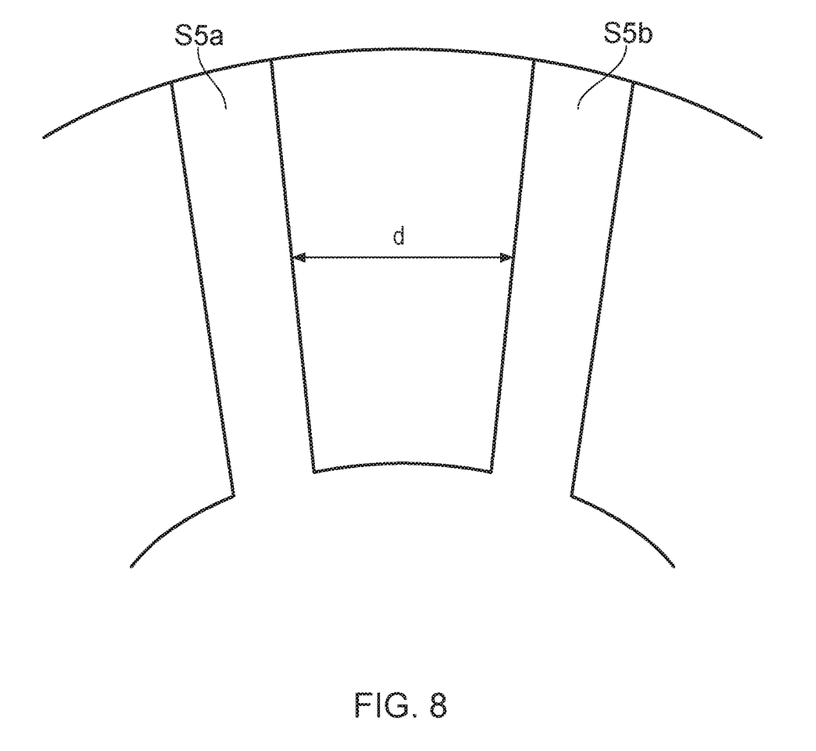
FIG. 8 illustrates a view of the part of the gas turbine engine along the arrows A-A illustrated in FIG. 7.
Figure 9:
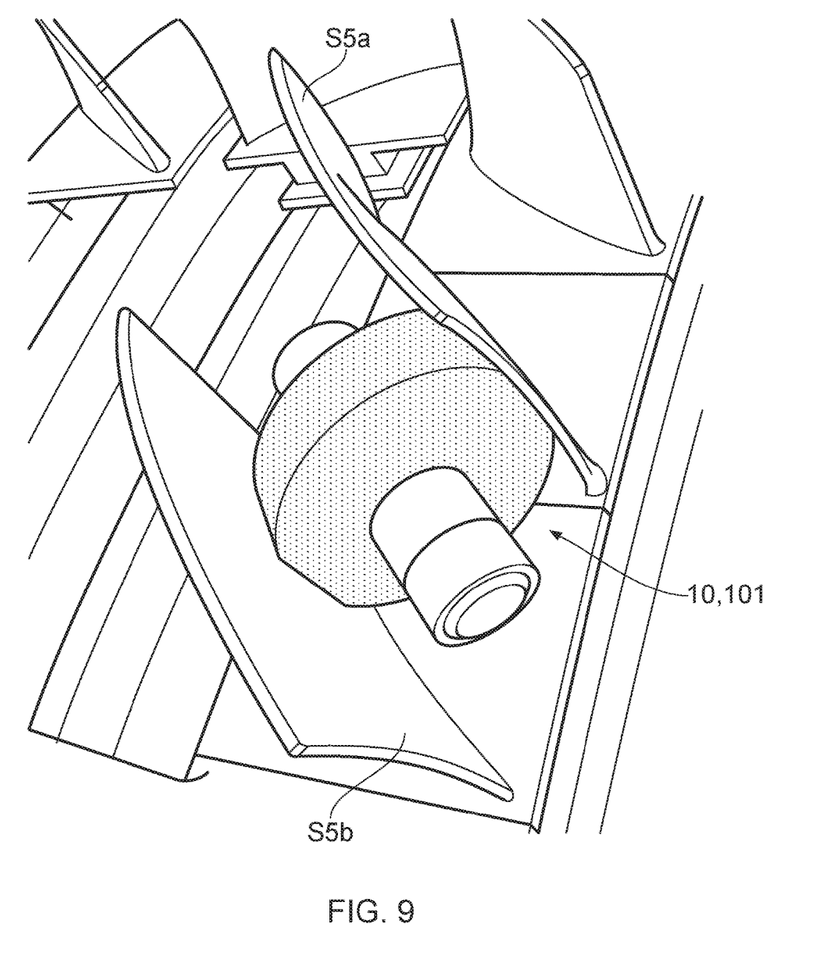
FIG. 9 illustrates a perspective view of an inspection apparatus secured between two aerofoils of a gas turbine engine.

The high pressure compressor 114 comprises an alternating series of rows of stationary in use stators (generally indicated by S4 to S6) and rotating in use rotors (generally indicated by R5 and R6). Each row of stators and rotors comprises a plurality of circumferentially arranged aerofoils, such as aerofoils S5a, S5b shown in FIG. 8. A gap d is provided between adjacent stator blades in each row. A similar size gap is provided between adjacent rotors in each row. As mentioned above, the maximum dimension 46 of the one or more foam members 26 may be 30% or greater than the width of the gap d defined by the aerofoils S5a, S5b to enable the inspection apparatus 10, 101 to be secured between the aerofoils S5a, S5b as illustrated in FIG. 9.

At block 64, the method includes causing relative movement between a part of the gas turbine engine 110 and the inspection apparatus 10, 101. For example, where the inspection apparatus 10, 101 is secured between the aerofoils S5a, S5b, the method may include causing movement of the rotor R6 to enable the inspection apparatus 10, 101 to inspect the rotor R6. By way of a further example, where the inspection apparatus 10, 101 is secured between the aerofoils R5, the method may include causing movement of the rotor R5 to enable the inspection apparatus 10, 101 to inspect the stator S5.

At block 66, the method includes removing one or more inspection apparatus 10, 101 from the gas turbine engine 110. For example, the positioning tool 52 may be inserted through the inspection port 134 so that the snake arm 56 and the connector 58 are moved to the inspection apparatus 10, 101. The connector 58 may then attach to the connector 22, and the inspection apparatus 10, 101 may then be removed by withdrawing the snake arm 56 through the inspection port 134.

The apparatus 10, 101 may provide several advantages. First, the use of the one or more foam members 26 may enable the inspection apparatus 10, 101 to be relatively easily inserted into a gas turbine engine via an inspection port and fixed in position between two surfaces. Second, the one or more foam members 26 may be relatively inexpensive and easily replaced. Third, if the one or more foam members 26 become detached from the housing 24, the one or more foam members 26 may be relatively easy to remove from the gas turbine engine (since they may be easily gripped by a retrieval tool and are compressible and thus may be easily withdrawn through small gaps).

It will be understood that the invention is not limited to the embodiments above-described and various modifications and improvements can be made without departing from the concepts described herein. For example, the inspection apparatus 10, 101 may be used to inspect systems other than a gas turbine engine. For example, the inspection apparatus 10, 101 may be used to inspect parts of a nuclear reactor.

Except where mutually exclusive, any of the features may be employed separately or in combination with any other features and the disclosure extends to and includes all combinations and sub-combinations of one or more features described herein.

The invention claimed is:

1. A capsule camera for a gas turbine engine, the capsule camera comprising:
    a sensor configured to generate data, the sensor comprising a camera configured to generate images;
    a housing having an exterior surface, the sensor being housed by the housing; and
    one or more foam members coupled to the exterior surface of the housing, the one or more foam members being resilient to enable the capsule camera to be inserted into a gas turbine engine and secured between at least two surfaces of the gas turbine engine.

2. The capsule camera as claimed in claim 1, wherein the housing has a longitudinal axis and a length along the longitudinal axis, the one or more foam members having a length along the longitudinal axis of between twenty five percent and one hundred percent of the length of the housing.

3. The capsule camera as claimed in claim 2, wherein the one or more foam members have a length along the longitudinal axis of between twenty five percent and thirty five percent of the length of the housing.

4. The capsule camera as claimed in claim 1, wherein the housing has a longitudinal axis and a maximum dimension perpendicular to the longitudinal axis, the one or more foam members having a maximum dimension perpendicular to the longitudinal axis greater than the maximum dimension of the housing.

5. The capsule camera as claimed in claim 1, further comprising a light emitter configured to emit light within a field of view of the camera, the light emitter being housed by the housing.

6. The capsule camera as claimed in claim 1, further comprising communication circuitry configured to wirelessly transmit the generated data, the communication circuitry being housed by the housing.

7. The capsule camera as claimed in claim 1, further comprising a memory configured to store the generated data, the memory being housed by the housing.

8. The capsule camera as claimed in claim 1, further comprising an electrical energy storage device configured to supply electrical energy to at least the sensor, the electrical energy storage device being housed by the housing.

9. The capsule camera as claimed in claim 1, further comprising a connector configured to connect to a positioning tool.

10. A method of inspecting a gas turbine engine, the method comprising:
    providing one or more capsule cameras as claimed in claim 1;
    inserting one or more of the capsule cameras into a gas turbine engine so that the is one or more capsule cameras are secured between at least two surfaces of the gas turbine engine; and
    causing relative movement between a part of the gas turbine engine and the one or more capsule cameras, the part of the gas turbine engine being adjacent to the at least two surfaces.

* * * * *